United States Patent
Yang

(10) Patent No.: US 9,898,338 B2
(45) Date of Patent: Feb. 20, 2018

(54) NETWORK COMPUTER SYSTEM AND METHOD FOR DYNAMICALLY CHANGING EXECUTION SEQUENCE OF APPLICATION PROGRAMS

(75) Inventor: Liqun Yang, Guangdong (CN)

(73) Assignee: Zhuhai Ju Tian Software Technology Company Limited, Guangdong (CN)

( * ) Notice: Subject to any disclaimer, the term of this patent is extended or adjusted under 35 U.S.C. 154(b) by 698 days.

(21) Appl. No.: 13/878,301

(22) PCT Filed: Sep. 30, 2011

(86) PCT No.: PCT/CN2011/080471
§ 371 (c)(1),
(2), (4) Date: May 13, 2013

(87) PCT Pub. No.: WO2012/048622
PCT Pub. Date: Apr. 19, 2012

(65) Prior Publication Data
US 2013/0219404 A1    Aug. 22, 2013

(30) Foreign Application Priority Data
Oct. 15, 2010    (CN) .......................... 2010 1 0510598

(51) Int. Cl.
G06F 9/50        (2006.01)
G06F 9/48        (2006.01)

(52) U.S. Cl.
CPC .......... *G06F 9/5016* (2013.01); *G06F 9/4881* (2013.01)

(58) Field of Classification Search
CPC .............................. G06F 9/4881; G06F 9/5016
See application file for complete search history.

(56) References Cited

U.S. PATENT DOCUMENTS

2001/0039575 A1    11/2001  Freund et al.
2001/0049727 A1*   12/2001  Mukherjee .............. H04L 29/06
                                                            709/219
(Continued)

FOREIGN PATENT DOCUMENTS

CN        1225472 A    8/1999
CN      101166208 A    4/2008
(Continued)

OTHER PUBLICATIONS

International Search Report dated Dec. 15, 2011, from PCT/CN2011/080471 filed Sep. 30, 2011.
(Continued)

*Primary Examiner* — Benjamin Wu
*Assistant Examiner* — Jorge A Chu Joy-Davila
(74) *Attorney, Agent, or Firm* — HoustonHogle LLP

(57) ABSTRACT

A computer system and operating method thereof are provided. The computer system comprises a central processing unit (21) and a random access memory (22). The random access memory (22) is provided with a resource allocating management storage region (32) for storing execution sequence of the central processing unit executing an application program, and a resource allocating management unit (31) for dynamically changing the execution sequence according to request amount of resource occupied by a plurality of application programs, wherein the execution sequence is such that the execution priority level of an application program with a small request amount of resource is higher than the execution priority level of an application program with a large request amount of resource. The method comprises the following steps: the resource allocating management unit (31) receives information on request amount of resource sent from a plurality of application programs; writes an execution sequence of the plurality of (Continued)

| execution priority level | application program | length of the request slot |
|---|---|---|
| 1 | D program of client terminal 27 | 5ms |
| 2 | B program of client terminal 29 | 10ms |
| ... | ... | ... |
| 9 | C program of client terminal 28 | 150ms |
| 10 | A program of client terminal 27 | 250ms | application programs into the resource allocating management storage region (32); the resource allocating management unit (31) dynamically changes the execution sequence according to request amount of resource occupied by the application programs; and the central processing unit (21) executes the application programs according to the execution sequence.

6 Claims, 4 Drawing Sheets

(56) References Cited

U.S. PATENT DOCUMENTS

| | | | |
|---|---|---|---|
| 2005/0155550 A1* | 7/2005 | Kitano | G03F 7/162 118/676 |
| 2005/0207439 A1* | 9/2005 | Iyengar | H04L 67/322 370/428 |
| 2006/0123115 A1* | 6/2006 | Satomi | G06F 9/5044 709/226 |
| 2006/0288346 A1* | 12/2006 | Santos | G06F 9/4887 718/102 |
| 2007/0143827 A1* | 6/2007 | Nicodemus | G06F 21/6218 726/2 |
| 2008/0155550 A1* | 6/2008 | Tsafrir | G06F 9/5066 718/103 |
| 2010/0070661 A1* | 3/2010 | Cherry | H04L 43/0805 710/19 |
| 2010/0094828 A1* | 4/2010 | Mehta | G06F 9/5027 707/705 |

FOREIGN PATENT DOCUMENTS

| | | |
|---|---|---|
| CN | 101968750 A | 2/2011 |
| WO | 2007/017296 A1 | 2/2007 |

OTHER PUBLICATIONS

International Preliminary Report on Patentability and the Written Opinion of the International Searching Authority dated Apr. 25, 2013, from counterpart International Application No. PCT/CN2011/080471, filed Sep. 30, 2011.

* cited by examiner

| execution priority level | application program | length of the request slot |
|---|---|---|
| 1 | A program of client terminal 27 | 250ms |
| 2 | B program of client terminal 29 | 10ms |
| 3 | C program of client terminal 28 | 150ms |
| ... | ... | ... |
| 10 | D program of client terminal 27 | 5ms |

Fig.4

| execution priority level | application program | length of the request slot |
|---|---|---|
| 1 | D program of client terminal 27 | 5ms |
| 2 | B program of client terminal 29 | 10ms |
| ... | ... | ... |
| 9 | C program of client terminal 28 | 150ms |
| 10 | A program of client terminal 27 | 250ms |

Fig.5

NETWORK COMPUTER SYSTEM AND METHOD FOR DYNAMICALLY CHANGING EXECUTION SEQUENCE OF APPLICATION PROGRAMS

FIELD OF TECHNOLOGY

The present invention relates to a computer system, especially relates to network computer system and the operating method of the computer system. The invention is based on Chinese application for patent for invention with No. 201010510598.0 filed on Oct. 15, 2010, the content of the application is hereby incorporated as reference literature closely related to the invention.

BACKGROUND OF THE INVENTION

Personal computer is an important device in modern office and life, along with the development of technology, personal computer has been miniaturized, highly integrated, and its computing power has also become more and more powerful. Since 1990s, along with the development of the network technique, the form of the personal computer has changed with diversity, deriving various kinds of computer system with special functions, including the network computer system.

Referring to FIG. 1, a related network computer system consisting of a server 1 and three client terminals 17, 18, 19 is provided, certainly the number of client terminal can be larger, the client terminal 17, 18, 19 can be personal computers having a CPU (central processing unit), an inner memory, a hard disk and an input/output device, and can also be network computer terminals only provided with a CPU, an inner memory and an input/output device.

The server 1 is provided with a CPU 11, an inner memory as RAM (random access memory), a hard disk as electrically erasable read-only memory 13 and a plurality of network interfaces 14, 15, 16, each network interface 14, 15, 16 communicates with client terminals 17, 18, 19 in wired or wireless manner.

When the network computer system is working, each client terminal 17, 18, 19 runs a respective application program or runs a plurality of application programs simultaneously, so it needs to continuously send request for executing the application program to the server 1. The CPU of server 1 executes a plurality of application programs according to time sequence of plurality of application program requests after receiving the request for executing the plurality of the application programs.

DISCLOSE OF THE INVENTION

Technical Problem

Due to the plurality of client terminals 17, 18, 19 send a large number of requests for the executing of the application program to the server 1 disorderly, and the CPU of the server 1 only executes according to the request time sequence of a plurality of application programs, When the proportion of the occupied CPU 11 resource by certain running program is too large, for example 80%, it will result in that the start time of the application program of part of the client terminals is too long or the application program can't operate, when serious, it will cause the collapse of the operation of the network computer system. For example, when the request amount of resource occupied by the application program sent by certain client terminal to the server 1 is too large, namely, the CPU 11 needs more time to execute, then the CPU 11 needs to execute the application program before execution of the application program requested and sent by other client terminals later. Therefore it will result in that the later application programs occupied smaller resource can't be executed timely, and these client terminals response slowly.

The manner of the CPU 11 executing a plurality of application programs is distributing execution slots to each application program, when the request amount of resource requested by certain application program is larger, the length of slot distributed by the CPU 11 is relatively longer when executing the application program. Therefore, the CPU 11 only distributes shorter slot to execute part of the processes of later-requested application program in the idle time between executions of a plurality of processes of the application program.

Due to the idle time between the plurality of the processes of the prior application program is shorter, so the CPU 11 often can't execute the processes of the later application program, and the later application program can't be executed until the execution of the prior application program is finished, which results in the execution time of later application program is too long and the client terminal responses slowly.

Certainly, in the environment in which a single computer is running, there will be such problem that the request amount of resource requested by the prior application program is too large and results in that the later application program can't start timely, and the response time of the application program of the computer is too long, which causes the "crash" of the computer.

Solution of the Technology

The main purpose of the present invention is to provide a computer system which enables the application program with smaller request amount of resource responses rapidly.

Another purpose of the present invention is to provide a operating method of the computer system that can effectively avoid "crash" phenomenon of the computer.

In order to realize above-mentioned main purpose, the computer system provided by the present invention comprises: a CPU and a memory connected to the CPU; wherein, the memory is provided with a resource allocating management storage region for storing the execution sequence of the CPU executing an application program, the memory stores a resource allocating management unit used for dynamically changing the execution sequence according to request amount of resource occupied by each of a plurality of application programs, wherein the changed execution sequence is such that the execution priority level of an application program with a small request amount of resource is higher than the execution priority level of an application program with a large request amount of resource.

A preferred scheme is, the computer system is a network computer system, the network computer system comprises a server and a plurality of client terminals connected to the server, wherein a CPU and the memory connected to the CPU are provided in the server, a resource allocating management unit and a resource allocating management storage region are provided in the memory of the server.

Thus it can be seen, the server of the network computer system is provided with a resource allocating management unit which orders the execution sequence of a plurality of application programs of a plurality of client terminals, so the problem that the request amount of resource by certain application program of certain client terminal is too large and results in the slow running of other client terminals can be effectively avoided, and the running speed of all client terminals can be effectively improved.

In order to realize another above-mentioned purpose, the foregoing operating method of the computer system provided by the present invention comprises a resource allocating management unit to receive information on request amount of resource sent from a plurality of application programs and writes an execution sequence of the plurality of application programs into the resource allocating management storage region, the resource allocating management unit dynamically changes the execution sequence of the plurality of application programs according to the request amount of resource occupied by each application program, wherein the sort of the execution sequence is such that the execution priority level of an application program with a small request amount of resource is higher than the execution priority level of an application program with a large request amount of resource, and the CPU executes the plurality of application programs according to the priority levels of the plurality of application programs from high to low orderly.

It can be seen from foregoing scheme, the CPU prior executes the application program with small request amount of resource when executing the plurality of application programs, in this way, it can ensure the execution time of the resource with small request amount of resource is shorter, and the "crash" phenomenon caused by the slow response speed of the computer can be avoided.

A preferred scheme is, the computer system is a network computer system, the network computer system comprises a server and a plurality of client terminals connected to the server, wherein a CPU and the memory connected to the CPU are provided in the server, a resource allocating management unit and a resource allocating management storage region are provided in the memory of the server, the resource allocating management unit dynamically changes the execution sequence of a plurality of application programs of a plurality of terminals.

Thus it can be seen, the server of the network computer system can effectively manage the execution sequence and execution time of a plurality of application programs by resource allocating management unit, and the slowness of entire running speed of a plurality of client terminals can be avoided.

Further scheme is, the resource allocating management unit stores a threshold of computer resource usage, the resource allocating management unit determines whether the current computer resource usage is higher than the threshold, if higher, then dynamically changes the execution sequence of a plurality of application programs.

In this way, the resource allocating management unit only dynamically changes the execution sequence of the plurality of application programs when the computer resource usage is higher than the threshold, so the frequently changing of the execution sequence of the application programs can be avoided, and it is beneficial to the coherence of the execution of application program.

Advantageous Effects

The present invention adopts the resource allocating management unit to order execution sequence of a plurality of application programs, the application program with small request amount of resource can be executed prior, and the application program with large request amount of resource will be executed after the execution of the application program with small request amount of resource is finished. Thus, the CPU can reduce the execution priority level of the application program with large request amount of resource when it executes the application program, and prior executes other application program with small request amount of resource, the long execution time of the application program with small request amount of resource can be avoided, and thus the "crash" phenomenon is avoided.

BRIEF DESCRIPTION OF DRAWINGS

FIG. 4 is a storage schematic view of the resource allocating management storage region before changing the execution sequence in the first embodiment of the computer system of the present invention;

FIG. 5 is a storage schematic view of the resource allocating management storage region after changing the execution sequence in the first embodiment of the computer system of the present invention;

The following is detailed description of the present invention with reference to drawings and embodiments.

DETAILED DESCRIPTION OF THE EMBODIMENTS

The first embodiment of the computer system and the embodiment of the operating method of the computer system.

Figure 1:
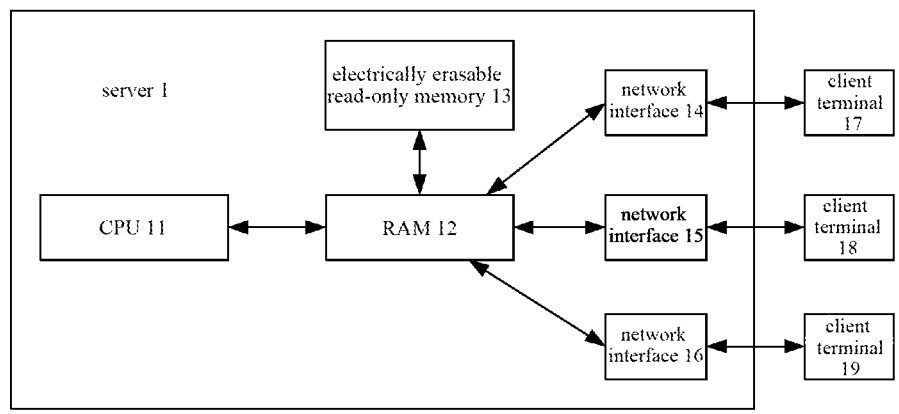
FIG. 1 is a structural schematic block diagram of a related network computer system.
Figure 2:
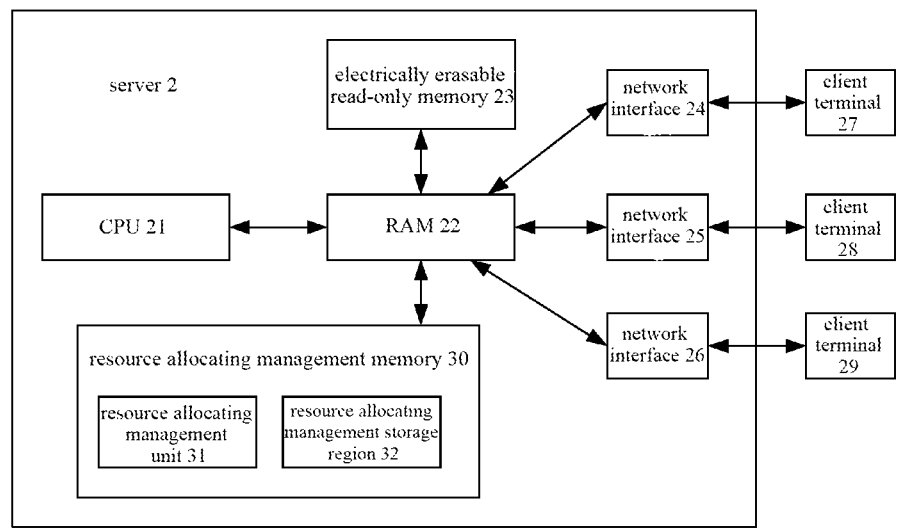
FIG. 2 is a structural schematic block diagram of the first embodiment of the computer system of the present invention.

Referring to FIG. 2, the computer system of the embodiment is a network computer system, having a server 2 and three client terminals 27, 28, 29, wherein, the server 2 is provided with a CPU 21, an inner memory as a RAM 22 and a hard disk as an electrically erasable read-only memory (ROM) 23. Certainly, a flash memory (flash) or a fixed hard disk can be used as hard disk. The server 1 is also provided with other auxiliary devices, such as input/output device, display card and the like.

The server 2 is provided with three network interfaces 24, 25, 26, connected to three client terminals 27, 28, 29 respectively in wired or wireless manner as a network. In this embodiment, three client terminals 27, 28, 29 are terminals all only provided with a CPU, an inner memory and an input/output device, no hard disk in them, so that the client terminals 27, 28, 29 all need to send execution request for application program to the server to realize the execution of the application programs.

The server 2 of this embodiment is also provided with a resource allocating management memory 30, the resource allocating management memory 30 can be a memory integrated on the mainboard of the server 2, to facilitate the server 1 integrating the function of the invention. The CPU 21 accesses the resource allocating management memory 30 through the RAM 22. The resource allocating management memory 30 is provided therein with a resource allocating management unit 31 and a resource allocating management storage region 32, the resource allocating management storage region 32 stores the execution sequence of a plurality of application programs waiting for execution by the CPU 21, and the resource allocating management unit 31 is used for the management of the execution sequence of the plurality of application programs, including dynamically real-time change of the execution sequence of each application program.

And, the resource allocating management unit 31 stores a threshold of resource usage, such as the threshold of usage rate of the CPU 21, for example 90%. The resource allocating management unit 31 dynamically changes the execution sequence of each application program if only the current usage rate of CPU 21 is higher than the threshold.

Figure 3:
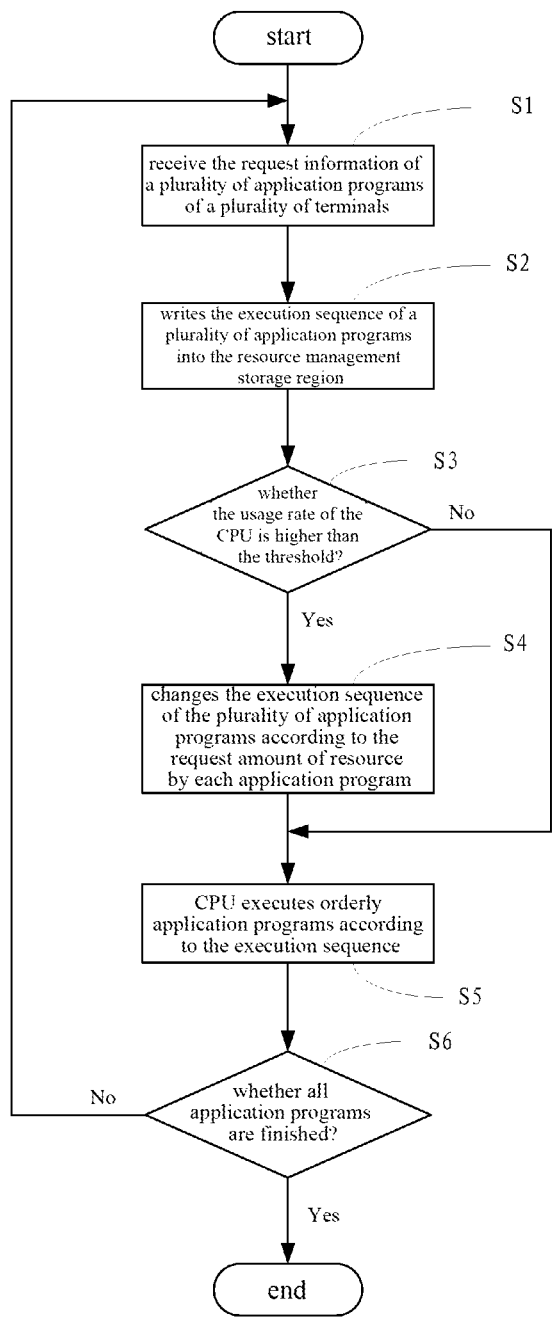
FIG. 3 is a flow chart of the embodiment of the operating method of the computer system of the present invention.

Referring to FIG. 3, when the network computer system is working, the client terminal sends the information on execution request of the application program to the server 2, the resource allocating management unit 31 of the server 2 will receive the request information of each application program sent from the plurality of terminals, namely performs step S1. The resource allocating management unit 31 performs step S2 to write the execution sequence of a plurality of application programs into the resource allocating management storage region 32 after receiving request information on a plurality of application programs. The newly-requested application program will be written into the end of the sequence if in the execution sequence in the resource allocating management storage region 32 there still is unfinished application programs, namely, the execution priority level of the newly-requested application program is the lowest.

For example, as shown in FIG. 4, the execution sequence stored in the resource allocating management storage region includes nine application programs need to be executed, including A program of the client terminal 27, B program of the control terminal 29, C program of the client terminal 28 and the like. After the client terminal 27 sends the information on the execution request of D program to the server 2, the D program will be written into the table of the execution sequence by the resource allocating management unit, and the execution sequence of the D program is 10, which is the lowest execution priority level.

Then, the resource allocating management unit 31 performs step S3 to determine whether the current usage rate of the CPU 21 is higher than the threshold, if it is higher than the threshold, step S4 will be performed to dynamically change the execution sequence of each application program.

At this time, the resource allocating management unit 31 determines the request amount of resource requested by each application program, which is the occupied slot length of CPU, and changes the execution sequence of each application program according to the length of occupied slot. The principle of changing execution sequence is, the priority level of the application program with large request amount of resource, which occupies longer slot, is low, the priority level of the application program with small request amount of resource, which occupies shorter slot, is high.

According to the above-mentioned principle of changing, the execution sequence after changing is shown as in FIG. 5. Due to the D program of the client terminal 27 occupies the shortest slot, only 5 ms, so the execution priority level is highest, its execution sequence is "1". The B program of the client terminal 29 occupies 10 ms of slot, just longer than the slot occupied by A program, its execution priority level is higher, the execution sequence is "2". The slot that A program of the client terminal 27 occupies is the longest, so its execution priority level is lowest, the execution sequence is "10". While the slot occupied by C program of the client terminal 28 is longer, so the execution priority level is lower, the execution sequence is "9".

And so on, the resource allocating management unit changes the execution priority level of each application program according to the slot length occupied by it.

Certainly, if the usage rate of the CPU 21 is lower than the threshold, the resource allocating management unit will not change the execution sequence of the application program, namely the execution sequence of the plurality of application programs is arranged according to the time sequence of the application program request.

Then, the CPU 21 performs step S5, it executes the application programs according to the execution sequence stored in the resource allocating management storage region 32 in order from high priority level to low priority level.

When the CPU 21 executes a application program, it distributes very short slot to the application program and executes a process or thread of the application program in the slot, when a process or thread is executed, the CPU 21 has idle slot, which can be used to execute a process or thread of the next application program.

When a process or thread is executed, the resource allocating management unit 31 needs to reorder the sequence of the execution stored in the resource allocating management storage region 32, and remove the finished application program from the execution sequence, and update the remaining slot length occupied by each application program, then order the execution sequence of each application program according to remaining length of the occupied slot.

Certainly, the CPU 21 also determines whether the execution of all application programs are finished, in other words, performs step S6, if there still is unfinished application program, returns to step S1, or the CPU 21 executes the application programs according to updated execution sequence.

Thus it can be seen, the resource allocating management unit 31 dynamically real-time changes the execution sequence of a plurality of application programs, and updates the execution sequence immediately when a thread or process of certain application program is executed, then executes a process or thread of the next application program. In this way, the plurality of application programs are executed alternatively, and the execution priority level of the application program with small request amount of resource is higher and the time of it is shorter, and the response speed within the client terminal is faster.

It is clear that, even though certain client terminal sends a application program request with large request amount of resource to the server, it will not result in the application program with small request amount of resource requested later can't be executed timely, thus the problem that the long response time of the application program requested later is avoided, so that the "crash" phenomenon at the client terminal can be avoided effectively.

Due to the execution time of the application program with small request amount of resource is often shorter, and there usually have more idle slots between the execution of application programs with small request amount of resource which can be used to execute application programs with large request amount of resource, so that the prior execution of the application program with small request amount of resource will not result in that the waiting time for the execution of the application program with large request amount of resource is too long.

When executing application program, the CPU 21 needs to exchange data with the RAM 22 and the electrically erasable read-only memory 23, and to transfer the data to client terminals 27, 28, 29 through the network interfaces 24, 25, 26, therefore certain application program, which occupies longer slot of the CPU 21, will occupies more usage of the RAM 22, resource of the electrically erasable read-only memory 23 and the network resource.

It is thus clear that, the request amount of computer resource occupied by an application program is not always the occupied slot length of the CPU 21, also can be the usage occupied the RAM 22, or the usage occupied the network resource, such as the amount of the data traffic and the like.

The second embodiment of the computer system.

Figure 6:
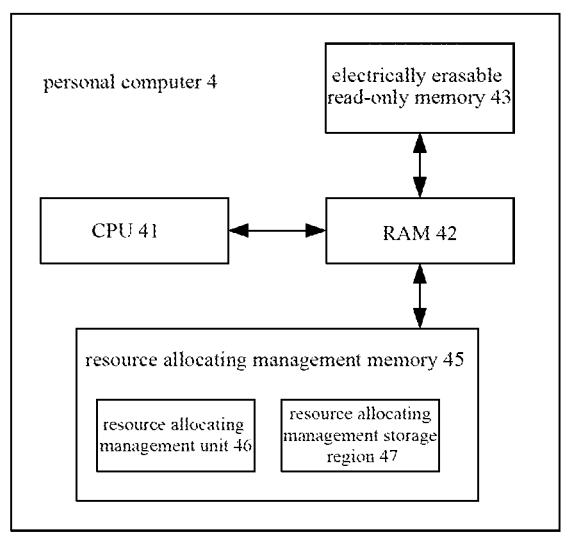
FIG. 6 is a structural schematic block diagram of the second embodiment of the computer system of the present invention.

Referring to FIG. 6, the computer system of this embodiment is a personal computer 4, which has a CPU 41, an inner memory as a RAM 42, a hard disk as an electrically erasable read-only memory 43, and is provided with auxiliary equipments, such as input/output device, display card and the like.

The personal computer 4 is also provided with a resource allocating management memory 45 integrated on the mainboard of the computer 4, the resource allocating management memory 45 is provided with a resource allocating management storage region 47 and a resource allocating management unit 46, the resource allocating management storage region 47 stores the execution sequence of a plurality of application programs to be executed by the CPU 41, the resource allocating management unit 46 dynamically real-time changes the execution sequence of a plurality of application programs, to ensure the prior execution of the application program with small request amount of resource, thus the startup and response speed of the application program with small request amount of resource are improved, and the "crash" phenomenon is avoided.

While working, the personal computer 4 still determines whether it needs to change the execution sequence of application programs according to the current usage rate of the CPU 41, if the current usage rate of the CPU 41 is lower than the threshold, the resource allocating management unit 46 won't change the execution sequence of application programs, avoiding the resource allocating management unit 46 frequently changing the execution sequence of application programs, and keeping the coherence of the execution of the application programs.

Certainly, foregoing embodiments are only preferred implementation schemes of the present invention, there may be many modifications in practical application, for example, the resource allocating management unit and the resource allocating management storage region is provided in a hard disk instead of the separated resource allocating management memory; or the resource allocating management storage region is provided on the RAM or other storage devices; or, the resource allocating management unit is provided on other external storage devices such as USB disk, mobile hard disk, the purpose of the present invention can also be realized through these modifications.

Finally, it should be emphasized that, the present invention is not limited to foregoing embodiments, such as the change of the threshold of the computer resource usage, the change of the form of the computer system memory also should be included within the scope of the claims of the present invention.

INDUSTRIAL APPLICABILITY

Due to the resource allocating management unit orders the execution sequence of a plurality of application programs, the application program with small request amount of resource can be executed prior, and the application program with large request amount of resource will be executed after the execution of the application program with small request amount of resource is finished. Thus, the CPU can reduce the execution priority level of the application program with large request amount of resource when it executes the application program, and prior executes other application programs with small request amount of resource, the long execution time of the application program with small request amount of resource can be avoided, and thus the "crash" phenomenon is avoided.

The invention claimed is:

1. A network computer system, comprising a server and a plurality of client terminals connecting to the server through a network and requesting the server to execute a plurality of application programs of the client terminals using a resource in the server, the network computer system further comprising:
a CPU, a Random Access Memory (RAM), and a resource memory connected to the CPU via the RAM in the server;
wherein the resource memory is provided with a resource allocating management storage region for storing an initial execution sequence for which the CPU executes the plurality of application programs according to a time sequence of an application program request;
wherein the resource memory is further provided with a resource allocating management unit in which a threshold of resource usage is stored;
as the server processes the plurality of application programs from the plurality of client terminals, wherein the plurality of application programs request an amount of the resource to be occupied during execution of the plurality of application programs, the resource allocating management unit determining the resource usage during execution of one or more application programs of the plurality of application programs and based on determining that the resource usage is higher than the threshold, dynamically changing the initial execution sequence of the plurality of application programs according to the requested amount of the resource to be occupied by each of the plurality of application programs after the execution of at least one process or thread of the one or more application programs is finished, wherein the changed execution sequence is such that an execution priority level of an application program with a small requested amount of resource is higher than the execution priority level of an application program with a large requested amount of resource and executing application programs with large requested amount of resources in idle time slots between the execution of application programs with small requested amount of resources, wherein the requested amount of resource to be occupied by each of the plurality of application programs comprises a slot length of the CPU, a usage of the RAM and/or a usage of a network resource; and
wherein based on determining by the resource allocating management unit that the resource usage is lower than the threshold, the resource allocating management unit maintains the initial execution sequence of the plurality of application programs.

2. The network computer system according to claim 1, wherein in response to the requested amount of resource to be occupied by each of the plurality of application programs being the slot length of the CPU, the threshold of the resource usage is a threshold of the CPU usage rate.

3. The network computer system according to claim 1, wherein the resource memory comprises an integrated memory integrated on a mainboard of the network computer system, and wherein the resource allocating management unit is stored on the integrated memory.

4. The network computer system according to claim 1, wherein as the server processes the plurality of application programs of the client terminals, the resource allocating management unit receives information on the requested amount of resource sent by the plurality of application programs, writes the execution sequence of the plurality of application programs into the resource allocating management storage region;
wherein the resource allocating management unit determining the resource usage is higher than the threshold of the resource usage, if higher, then dynamically changing the initial execution sequence of the plurality of application programs according to the requested amount of resource to be occupied by each of the plurality of application programs after the execution of at least one process or thread of the one or more application programs is finished, wherein the execution sequence is such that the execution priority level of an application program with a small requested amount of resource is higher than the execution priority level of an application program with a large requested amount of resource, wherein the requested amount of resource to be occupied by the plurality of application programs comprises the slot length of the CPU, the usage of the RAM and/or the usage of the network resource; and
wherein the CPU orderly executes the plurality of application programs according to the priority levels of the plurality of application programs from high to low.

5. The network computer system according to claim 4, wherein if the resource allocating management unit determines the resource usage is lower than the threshold, orders the initial execution sequence of the plurality of application programs according to the time sequence of the application program request.

6. A method of operation of a network computer system, comprising a server and a plurality of client terminals connecting to the server through a network and requesting the server to execute application programs of the client terminals using a resource in the server, the network computer system comprising: a CPU, a Random Access Memory (RAM), and a resource memory connected to the CPU via the RAM in the server;
wherein the method comprises:
a resource allocating management unit of the server setting an initial execution sequence of the application programs for which the CPU executes the plurality of application programs according to a time sequence of an application program request;
the resource allocating management unit determining resource usage during execution of the application programs;
the resource allocating management unit determining if a threshold of the resource usage is exceeded;
dynamically changing the initial execution sequence of the plurality of application programs according to the requested amount of the resource to be occupied by each of the plurality of application programs after the execution of at least one process or thread of the one or more application programs is finished in response to the resource usage being higher than the threshold;
changing the execution sequence to increase an execution priority level of an application program with a small requested amount of resource to be higher than the execution priority level of an application program with a large requested amount of resource;
executing application programs with large requested amount of resources in idle time slots between the execution of application programs with small requested amount of resources; and
then determining by the resource allocating management unit that the resource usage is lower than the threshold; and
the resource allocating management unit returning to the initial execution sequence of the plurality of application programs in response to determining that the resource usage is lower than the threshold.

* * * * *